US012691424B2

(12) United States Patent
Adell et al.

(10) Patent No.: US 12,691,424 B2
(45) Date of Patent: Jul. 28, 2026

(54) BEVERAGE INGREDIENT ACCESSORY DEVICE

(71) Applicants: Alec Adell, Sheridan, WY (US); Scott Adell, Sheridan, WY (US)

(72) Inventors: Alec Adell, Sheridan, WY (US); Scott Adell, Sheridan, WY (US)

( * ) Notice: Subject to any disclaimer, the term of this patent is extended or adjusted under 35 U.S.C. 154(b) by 578 days.

(21) Appl. No.: 18/225,106

(22) Filed: Jul. 22, 2023

(65) Prior Publication Data

US 2025/0025844 A1 Jan. 23, 2025

(51) Int. Cl.
*B01F 21/00* (2022.01)
*B01F 101/14* (2022.01)

(52) U.S. Cl.
CPC ............ *B01F 21/501* (2022.01); *B01F 21/15* (2022.01); *B01F 2101/14* (2022.01)

(58) Field of Classification Search
CPC .... B01F 21/501; B01F 21/15; B01F 2101/14; B65D 85/808
See application file for complete search history.

(56) References Cited

U.S. PATENT DOCUMENTS

| | | | | |
|---|---|---|---|---|
| 8,999,259 B2 * | 4/2015 | King | B01F 33/503 210/167.3 |
| 12,011,676 B1 * | 6/2024 | Keep | B01F 21/10 |
| 2014/0170036 A1 * | 6/2014 | Sherman | B01F 21/15 422/256 |
| 2020/0015630 A1 * | 1/2020 | Sammons | B01F 35/32025 |

* cited by examiner

*Primary Examiner* — Elizabeth M Kerr
*Assistant Examiner* — Keith Brian Assante

(57) ABSTRACT

A beverage ingredient accessory device is provided having a base portion utilizing a base portion outer side curvature, a first top surface lip and a second top surface lip. The base portion outer side curvature may terminate into the first top surface lip, and the second top surface lip may have a diameter smaller than that of the first top surface lip. The device has a cap portion disposed adjacent the base portion and utilizing a cap portion outer side curvature, a first bottom surface lip and a second bottom surface lip. The cap portion outer side curvature may terminate into the first bottom surface lip. The cap portion outer side curvature may have a plurality of apertures disposed therethrough. The second bottom surface lip may have a diameter smaller than that of the first bottom surface lip.

20 Claims, 9 Drawing Sheets

BEVERAGE INGREDIENT ACCESSORY DEVICE

BACKGROUND OF THE INVENTION

The global beverage market, which encompasses a broad array of drink types ranging from daily consumables like water, tea, coffee, to more specialized health-oriented drinks such as smoothies, protein shakes, and infused waters, is continually growing. As of 2021, it represented an industry worth nearly $1.5 trillion and it is projected to grow at a significant rate in the coming years. An associated sector that has seen significant growth along with the beverage industry is the market for beverage preparation and consumption accessories. This market includes a wide range of products including mixers, blenders, infusers, and other related accessories.

Despite the size and growth of this market, there are several notable issues and challenges. Many beverage preparation accessories are not user-friendly, and their operation can be complex or confusing. For example, mixers and infusers often require precise alignment or positioning of multiple components which can be cumbersome for users. Furthermore, many accessories are not dishwasher safe and can be difficult to clean. Other common issues include accessories that are not sufficiently durable, do not function effectively, or do not include features to ensure stability during use.

For instance, one crucial need in the beverage preparation accessory market revolves around the issue of inadequately mixed powder supplements. Many health-conscious consumers regularly utilize supplements such as protein powders, preworkout mixes, creatine, and other vitamin powders, which need to be mixed into a liquid medium, typically water. However, often these powder mixes fail to fully dissolve, leading to a lumpy and unappealing beverage. In other scenarios, the powder may fail to fully release from a mixing vessel, leading to an under-concentration of the supplement in the beverage and waste of the product. Furthermore, there is the common problem of powder leaking from the mixing vessel before it is submerged into the liquid medium, resulting in both mess and waste. Hence, there is a pressing need for a solution in the market that ensures a mess-free, fully dissolved, and complete release of powder supplements into a liquid medium, improving the overall quality and efficiency of beverage preparation.

An additional unmet need in the beverage preparation accessory market pertains to the robustness and durability of mixing vessels. Many users of these products are fitness enthusiasts who regularly transport their beverage ingredients and accessories in gym bags. These bags are often subjected to considerable movement, with the mixing vessels being tossed about alongside gym equipment, clothing, and other items. Unfortunately, many current beverage preparation accessories are not robust enough to withstand such conditions. This can result in the mixing vessels releasing the beverage ingredients prematurely, leading to spills and messes within the gym bag and wasting the beverage ingredients before they ever make it to the intended liquid medium. Therefore, a pressing need exists for a durable and robust mixing accessory that can securely contain beverage ingredients during transport, ensuring that they reach their intended destination without spillage or waste.

To address these issues, there is a clear need for a beverage ingredient accessory device that is user-friendly, easy to clean, durable, and effectively aids in the beverage preparation process. Such a device should also be designed with stability features to ensure a smooth and efficient operation. Ideally, the device would be crafted from dishwasher-safe and BPA-free materials to ensure the safety and longevity of the product. Additionally, it would be beneficial for the device to be designed with a clear indication of the open and locked states to further enhance usability.

Therefore, it would be advantageous to provide a beverage ingredient accessory device as a novel solution to these identified needs. Such a beverage ingredient accessory device may be designed with a unique interlocking mechanism that provides easy operation and clear indication of locked and open states. It would advantageous to provide a design that may include an outer shell and an inner shell that can rotate relative to one another, allowing for control of ingredient release through aligning apertures. Such a device may be made from a BPA-free and dishwasher-safe plastic polymer, addressing the need for safe and easy cleaning. Further, such a device may include high-friction material disposed at the base in order to ensure stability during use. It would be advantageous to provide a beverage ingredient accessory device that may be adapted to various shapes including spherical or pill-shaped, offering flexibility and versatility in its application. Such a device would thus represent a significant advance in the field of beverage preparation accessories, providing an efficient and user-friendly solution to the issues currently faced in the market.

DETAILED DESCRIPTION OF THE INVENTION

Before describing the present invention in detail, it is to be understood that the invention is not limited to any one of the particular embodiments, which of course may vary. It is also to be understood that the terminology used herein is for the purpose of describing particular embodiments only, and therefore is not necessarily intended to be limiting. As used in this specification and the appended claims, terms in the singular and the singular forms "a," "an," and "the" include plural referents unless the context clearly dictates otherwise. Thus, for example, reference to "a beverage ingredient accessory device" also includes a plurality of beverage ingredient accessory devices and the like.

Figure 1:
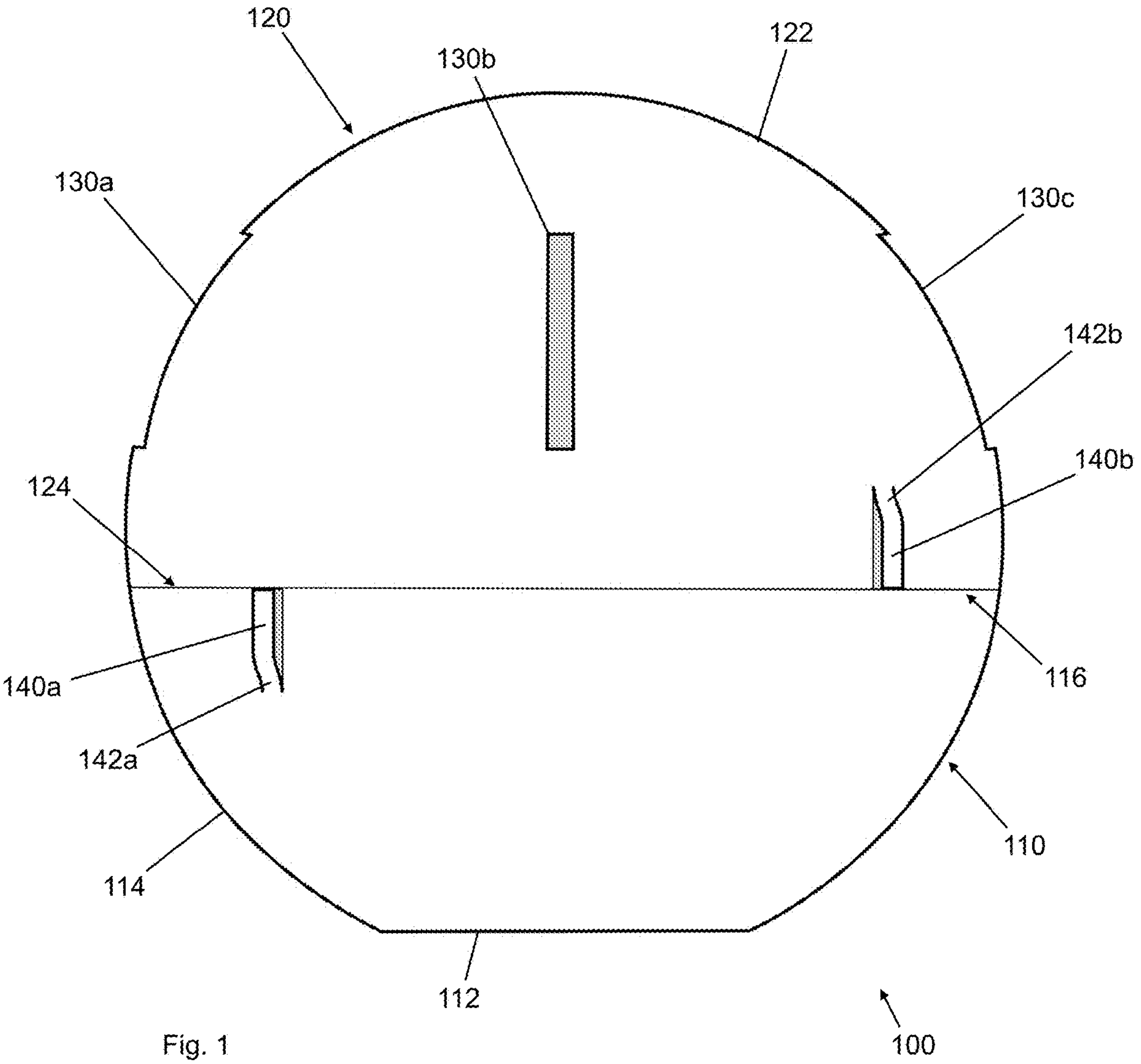
FIG. 1 illustrates an elevational view of a beverage ingredient accessory device with a cap portion and base portion aligned in a coupled configuration and a plurality of apertures of the cap portion aligned in a closed configuration in accordance with some embodiments of the present invention.

Exemplary embodiments of the present invention are illustrated in the accompanying figures. As shown in FIG. 1, an elevational view of a beverage ingredient accessory device 100 with a cap portion 120 and base portion 110 aligned in a coupled configuration and a plurality of apertures 130*a*-130*c* of the cap portion 120 aligned in a closed configuration is provided. The beverage ingredient accessory device 100 may comprise the base portion 110 and the cap portion 120 disposed over and coupled to the base portion 110. Specifically, the base portion 110 is coupled to the cap portion 120 via a coupling joint seam line between a top surface 116 of the base portion 110 and a bottom surface 124 of the cap portion 120 such that the base portion 110 may rotate relative the cap portion 120 along the coupling joint 124 about an axis running vertically through a dimensional midpoint of the beverage ingredient accessory device 100.

The base portion 110 may comprise a planar bottom surface 112 that terminates at its edges into a bottom side curvature 114 of the base portion 110 while the side curvature 114 may terminate at its top vertical extent into the top surface 116 of the base portion 110 as shown in FIG. 1. The base portion 110 may further comprise a first gripping structure 140*a* with an associated first tapered contour portion 142*a*. The first gripping structure 140*a* may be aligned relative a second gripping structure 140*b* which is disposed upon the cap portion 120. The base portion 110 and the cap portion 120 may be placed into a coupled configuration and a decoupled configuration via this relative alignment.

When the first and second gripping structures 140*a*, 140*b* are placed in a misaligned state as is illustrated in FIG. 1, the base portion 110 and the cap portion 120 are in the coupled configuration. When the first and second gripping structures 140*a*, 140*b* are placed in an aligned state, the base portion 110 and the cap portion 120 are in the decoupled configuration which allows the base portion 110 to become structurally separated from any physical contact with the cap portion 120 such that the coupling joint seam line ceases to exist. The coupling joint seam line between the top surface 116 and the bottom surface 124 only exists when the base portion 110 and the cap portion 120 are in the coupled configuration.

The cap portion 120 may comprise a top side curvature 122 that is generally rounded in shape and that terminates at a bottom vertical extent into the bottom surface 124 the cap portion 120 as shown in FIG. 1. Further, the cap portion 120 may comprise the second gripping structure 140*b* and associated second tapered contour portion 142*a* as well as the plurality of apertures 130*a*-130*c* symmetrically disposed therearound. It may be advantageous to provide apertures 130*a*-130*c* that are symmetrically aligned around the perimeter of the cap portion 120 in order to optimize the fluid dynamics of a liquid medium (e.g. water and other consumable liquids) entering and exiting the interior of the beverage ingredient accessory device 100 in the coupled configuration in order to efficiently and effectively dissolve a beverage ingredient completely into the liquid medium. Symmetric arrangement may provide increased rates of inflow and outflow of the liquid medium into and out of the plurality of apertures 130*a*-130*c*. While only three apertures 130*a*-130*c* are illustrated in FIG. 1, it is understood that the present invention encompasses utilization of at least one symmetrically aligned aperture formed into the cap portion 120. Such symmetric alignment may include axial, vertical and/or horizontal symmetry.

The configuration, orientation, and shape of the apertures 130*a*-130*c* play a pivotal role in determining the inflow and outflow rates of the liquid medium, thereby affecting the efficiency and effectiveness of the beverage ingredient's dissolution process. While a symmetric alignment around the perimeter of the cap portion 120 offers benefits in fluid dynamics, optimizing the shape of these apertures can further enhance these benefits. For instance, the apertures may adopt a variety of shapes such as circular, oval, triangular, rectangular, or even more complex geometric shapes. These shapes can be selected and optimized for maximizing the rate of liquid inflow and outflow.

A circular shape may provide a uniform distribution of the liquid medium. Oval or elongated shapes could potentially enhance the velocity of the liquid medium entering and exiting the device, creating a more vigorous mixing action. Alternatively, a triangular or rectangular shape could increase the overall area of the apertures, permitting a larger volume of the liquid medium to interact with the beverage ingredient at any given time. Combinations of different shapes can also be used to harness the advantages of each shape, depending on the specific application and type of beverage ingredient to be dissolved. Such optimization and diversity in aperture shapes can further boost the dissolution of the beverage ingredient into the liquid medium, making the beverage ingredient accessory device 100 even more efficient and effective in its function.

Given the spherical design of the beverage ingredient accessory device 100, certain shape considerations may arise for the apertures 130*a*-130*c* that may further enhance the dissolution process of the beverage ingredient into the liquid medium. Specifically, an oval or elliptical shape for the apertures may offer substantial benefits for this application. The curved nature of an oval shape can harmonize with the spherical geometry of the device 100, maintaining the overall structural integrity of the cap portion 120. In addition, the elongation of an oval shape can provide a larger opening than a simple circular aperture, permitting a higher volume of the liquid medium to pass through at any given time, thus facilitating a rapid inflow and outflow of the liquid medium. The elliptical shape can also induce a vortex-like fluid movement within the device 100 during the mixing process, which can stir the beverage ingredient more vigorously and promote an effective and thorough dissolution into the liquid medium. This synergistic effect of the spherical design of the device 100 and the elliptical shape of the apertures 130*a*-130*c* may result in an optimized mixing process and superior dissolution rates of the beverage ingredient.

In certain embodiments, personal customization of the beverage ingredient accessory device 100 may be achieved by configuring the apertures 130*a*-130*c* to take on unique shapes beyond traditional geometries. For example, the apertures may be formed in the shape of alphanumeric characters, symbols, or company logos, offering a distinctive aesthetic touch to the device 100 while still maintaining its functional purpose. This versatility allows businesses or consumers to tailor the device 100 to their specific branding or personal preferences, adding a level of visual engagement to the product. For business-to-consumer or business-to-business sales, this could be an effective strategy to promote brand recognition and loyalty, setting the product apart in a competitive marketplace. Importantly, the use of such shaped apertures must balance novelty and function, ensuring that the chosen design allows for optimal fluid flow and mixing capabilities to maintain the efficacy of the beverage ingredient dissolution process.

In further embodiments, to enhance the ease of use and ergonomic efficiency of the beverage ingredient accessory device 100, the gripping structures 140*a*, 140*b* on the base portion 110 and cap portion 120 may be designed in a variety of user-friendly shapes. These shapes may be specifically tailored to provide a comfortable and secure grip, allowing the user to efficiently lever and rotate the base portion 110 and cap portion 120 relative to one another with minimal effort. For instance, the gripping structures could take a form that complements the human grasp, such as rounded, textured or contoured forms. Additionally, the gripping structures could be shaped to provide visual cues for the user, with their form indicating the direction and manner of manipulation required for rotation. This flexibility in gripping structure design not only enhances user engagement with the device but also aids in preventing accidental decoupling or spillage, further reinforcing the overall functionality and user-friendliness of the beverage ingredient accessory device 100. The choice of gripping structure shape should consider factors such as ease of use, comfort, and aesthetics while maintaining the device's core functionality.

Figure 2A:
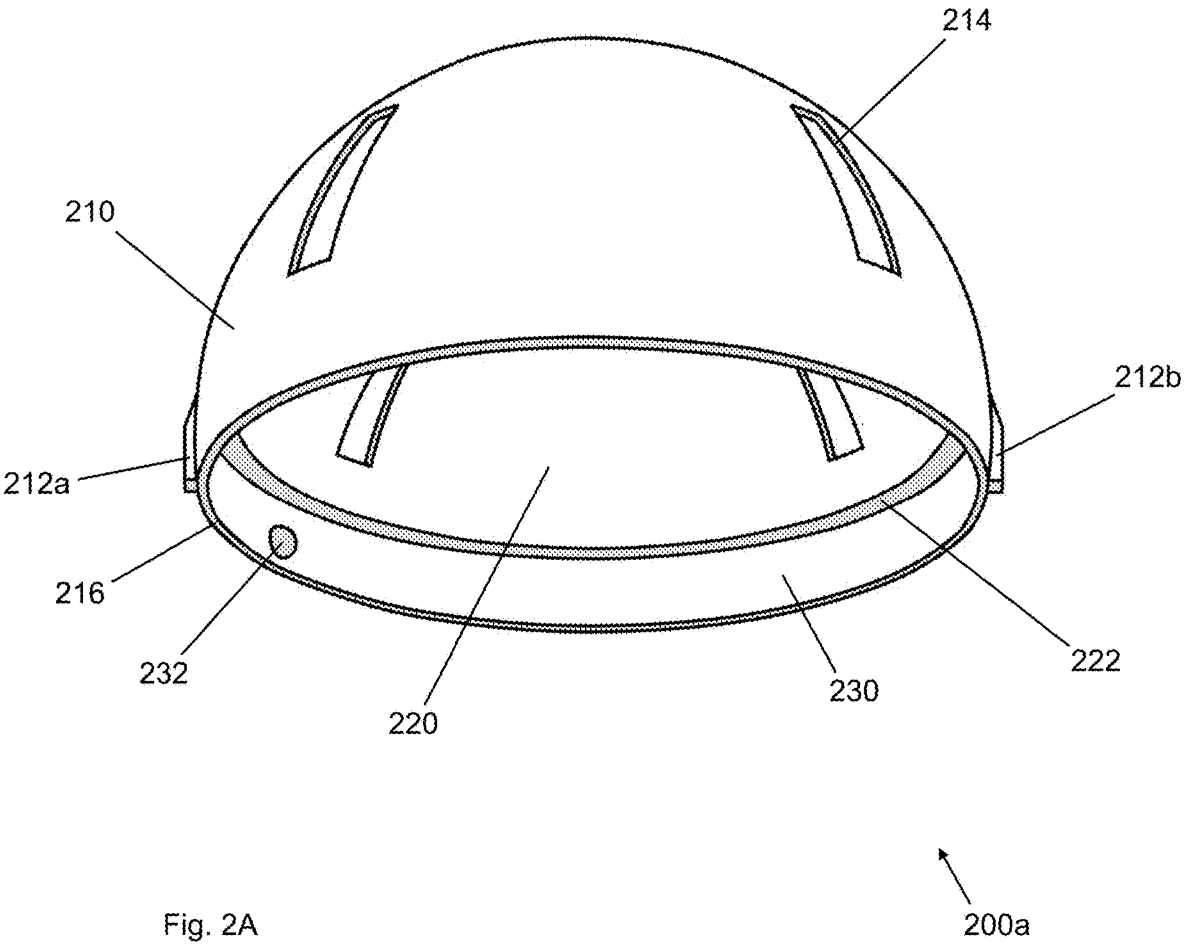
FIG. 2A illustrates a bottom perspective view of an outer shell of a cap portion of a beverage ingredient accessory device in accordance with some embodiments of the present invention.

As shown in FIG. 2A, a bottom perspective view of an outer shell 200*a* of a cap portion of a beverage ingredient accessory device is provided. The outer shell 200*a* may comprise an outer side curvature 210 having a first radius of curvature value. The outer side curvature 210 may comprise disposed thereon a first and second gripping structure 212*a*, 212*b* which may be disposed opposite one another or in a symmetric orientation about the circumference of the outer shell 200*a*. Where more than two gripping structures are utilize, they may also be disposed symmetrically about the circumference of the outer shell 200*a*.

Further, the outer shell 200*a* may comprise an inner side curvature 220 and a plurality of apertures 214 may be disposed through both the outer side curvature 210 and inner side curvature 220 as illustrated in FIG. 2A. Similarly, the apertures 214 may be disposed symmetrically about the circumference of both the outer side curvature 210 and inner side curvature 220. It is advantageous that the apertures 214 be disposed above an inner perimeter lip 222 so that the lip 222 may form a collective seal with a top surface of a base portion and an outer surface of an inner shell of the beverage ingredient accessory device.

Symmetrical arrangement of the apertures 214 around the circumference of both the outer side curvature 210 and inner side curvature 220 provides significant advantages in relation to the fluid dynamics associated with the dissolution of the beverage ingredient within the liquid medium. Firstly, the symmetrical distribution of apertures 214 can help to facilitate a balanced, even flow of the liquid medium into the interior of the device when it is immersed, thereby promoting a homogenous exposure of the beverage ingredient to the liquid medium. This configuration, coupled with the turbulent flow generated by the user's shaking or stirring actions, fosters an effective and efficient dissolution process.

Secondly, the symmetric alignment of the apertures 214 promotes an optimized vortex formation within the device when it is in motion, such as when it is being shaken or swirled within the liquid medium. This vortex creation can enhance the dissolution rate of the beverage ingredient by ensuring a consistent and thorough mixing of the ingredient with the liquid medium. Thirdly, the symmetrically aligned apertures 214 facilitate a balanced outflow of the liquid medium now mixed with the beverage ingredient. This even distribution of outflow reduces the likelihood of "channeling" where liquid exits primarily through a single or small group of apertures, which could lead to inefficient mixing or undesired residue of the beverage ingredient within the device.

The collective seal formed by the inner perimeter lip 222 with the top surface of the base portion and the outer surface of the inner shell aids in the preservation of these fluid dynamic benefits. By ensuring a fluid-tight interface, it prevents leakage or bypass of the liquid medium around the outside of the device, thereby directing the full flow of liquid through the symmetrically aligned apertures 214, optimizing the dissolution and mixing process. The symmetrical configuration of the apertures 214, therefore, may be important in ensuring that the beverage ingredient is efficiently and effectively dissolved within the liquid medium.

The outer shell 200*a* may further comprise a bottom surface lip 216 designed to be disposed adjacent a top surface of the base portion. Further, the outer shell 200*a* may comprise a bottom portion curvature 230 which may comprise a radius of curvature different than that of the outer side and inner side curvatures 210, 220. In some embodiments, the bottom portion curvature 230 may not comprise any vertical radial curvature but may comprise a horizontal radial curvature value that is similar or identical to that of the horizontal radial curvature of the outer side and inner side curvatures 210, 220. The bottom portion of the outer shell 200*a* comprising the bottom portion curvature 230 may further comprise one or more embossed structures 232 which are shaped to be complimentarily engaged by an associated structure of the base portion of the beverage ingredient accessory device.

Figure 2B:
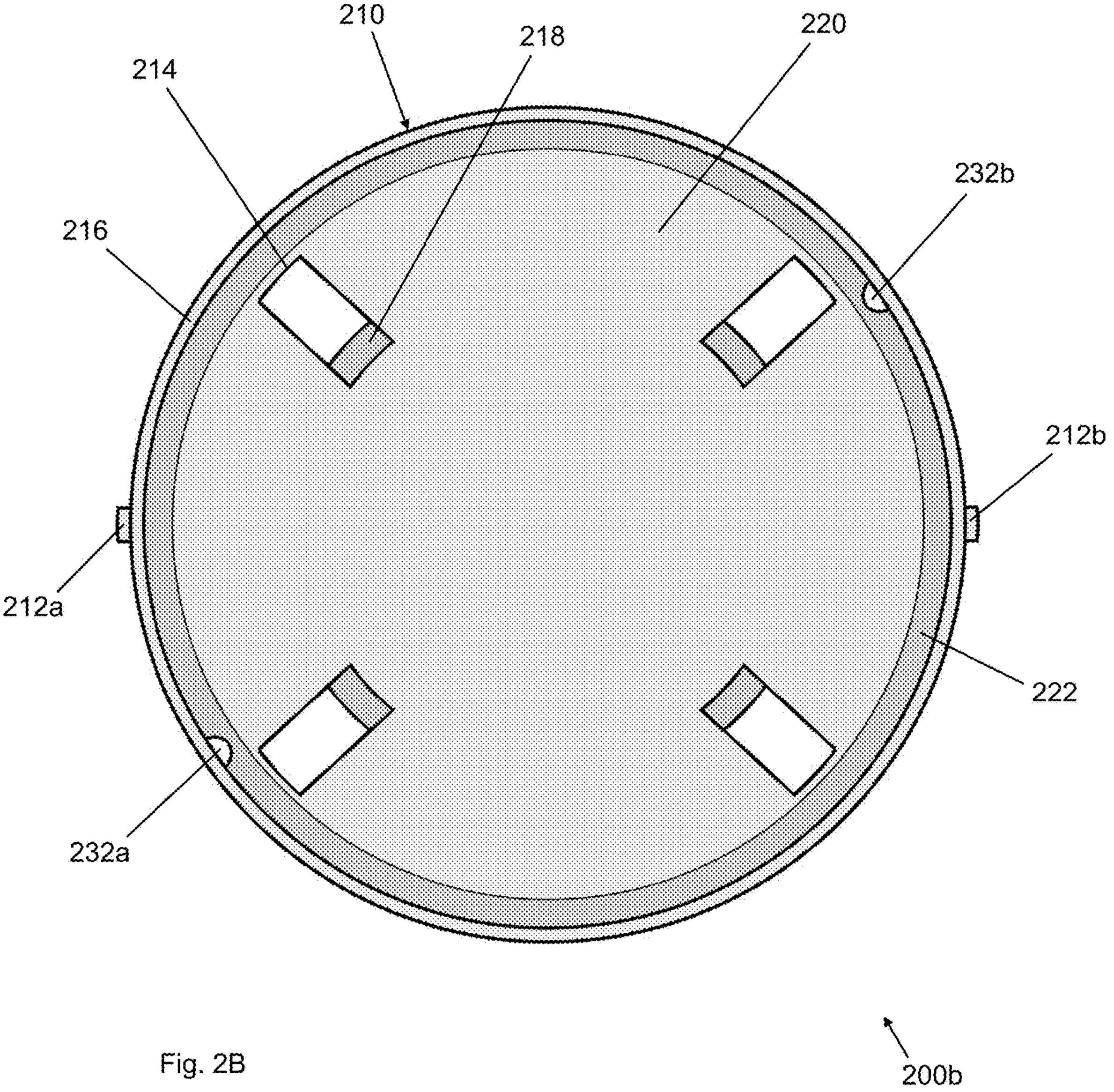
FIG. 2B illustrates a bottom plan view of an outer shell of a cap portion of a beverage ingredient accessory device in accordance with some embodiments of the present invention.

As shown in FIG. 2B, a bottom plan view of an outer shell 200*b* of a cap portion of a beverage ingredient accessory device is provided. The outer shell 200*b* may comprise the outer and inner side curvatures 210, 220 each comprising a radius of curvature value, the first and second gripping structures 212*a*, 212*b*, the plurality of apertures 214, the bottom surface lip 216, the inner perimeter lip 222 and first and second embossed structures 232*a*, 232*b* illustrated and described with respect to the outer shell 200*a* of FIG. 2A. However, FIG. 2B also illustrates an interior beveled edge 218 of each of the plurality of apertures 214. The interior beveled edge 218 may run along the entire interior of each of the plurality of apertures 214 in order to provide optimized fluid dynamics of a liquid medium passing in and out of an interior cavity of the beverage ingredient accessory device formed by the outer shell 200*b*, an inner shell and a base portion being in a coupled configuration.

The integration of interior beveled edges 218 on each of the apertures 214 brings additional fluid dynamics benefits to the mixing and dissolution process of the beverage ingredient within the liquid medium. Firstly, these beveled edges serve to minimize flow resistance or friction as the liquid medium enters and exits the interior cavity of the device through the apertures 214. This reduced resistance can enhance the speed and efficiency with which the liquid medium can interact with the beverage ingredient inside the device, thereby improving the overall dissolution rate.

Secondly, the interior beveled edges 218 can contribute to the formation of vortex flows within the device as it is shaken or swirled within the liquid medium. These vortices can further enhance the interaction between the beverage ingredient and the liquid medium, promoting a more complete and rapid dissolution. The vortices also assist in circulating the beverage ingredient throughout the liquid medium, ensuring a homogeneous and well-mixed final beverage. Thirdly, the beveled edges 218 may also facilitate the creation of a Venturi effect as the liquid medium flows through the apertures 214.

The Venturi effect can lead to an increased flow rate of the liquid medium through the device, further enhancing the rate of dissolution of the beverage ingredient. The Venturi effect, a principle in fluid dynamics, is characterized by fluid speed increasing while the fluid's pressure decreases when the fluid is passed through a constricted section. Within the context of the beverage ingredient accessory device, the interior beveled edges 218 can create a similar constrictive scenario in the apertures 214 when a liquid medium is introduced.

As the liquid medium is flowed through the apertures 214, the transition from the larger opening to the smaller, beveled interior section can increase the flow speed of the liquid medium, similar to the constriction in a Venturi section. This higher flow speed, in turn, decreases the pressure within the device. The lower pressure creates a suction-like effect, pulling more liquid medium into the device, which results in enhanced interaction between the beverage ingredient and the liquid medium.

Furthermore, the pressure differential, established due to the Venturi effect, aids in vigorously circulating the beverage ingredient throughout the liquid medium. This action greatly accelerates the dissolution rate of the beverage ingredient, ensuring a well-mixed beverage in a shorter period. Thus, by exploiting the Venturi effect, the beverage ingredient accessory device enhances the efficiency and effectiveness of mixing processes, yielding a consistently blended beverage with minimal effort and time.

Lastly, the beveled edges 218 can provide a self-cleaning function during the mixing process. As the liquid medium rushes through the apertures 214, the interior beveled edges 218 can help to dislodge any beverage ingredient particles that might have become stuck within the apertures, ensuring a more complete delivery of the ingredient into the liquid medium and reducing any residue or waste. The inclusion of the interior beveled edges 218 along each of the apertures 214 is thus a crucial feature that aids in optimizing the fluid dynamics of the liquid medium, facilitating a more effective and efficient dissolution of the beverage ingredient within the device. This ensures that the user receives a thoroughly mixed and homogeneous beverage with minimal effort.

Figure 3A:
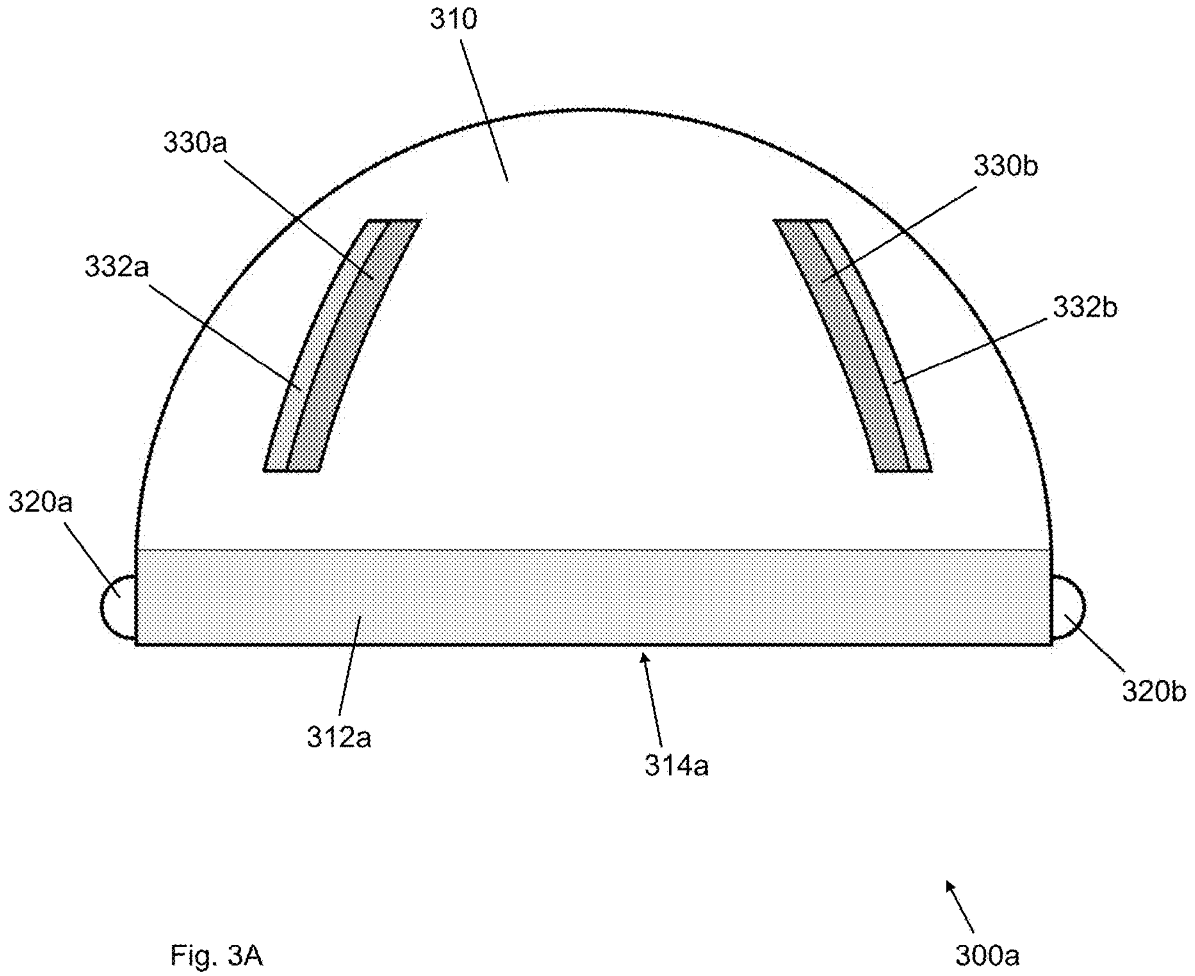
FIG. 3A illustrates a side elevational view of an inner shell of a cap portion of a beverage ingredient accessory device in accordance with some embodiments of the present invention.

As shown in FIG. 3A, a side elevational view of an inner shell 300*a* of a cap portion of a beverage ingredient accessory device is provided. The inner shell 300*a* may comprise an outer side curvature 310 having and a bottom portion outer curvature 312*a* each comprising a radius of curvature value. In some embodiments, the bottom portion outer curvature 312*a* may not comprise any vertical radial curvature but may comprise a horizontal radial curvature value that is similar or identical to that of the horizontal radial curvature of the outer side curvature 310. The bottom portion of the inner shell 300*a* comprising the bottom portion curvature 312*a* may further comprise first and second embossed structures 320*a*, 320*b* which are shaped to be complimentarily engaged by an associated structure of the base portion of the beverage ingredient accessory device.

The inner shell 300*a* may further comprise a bottom surface 314*a* which is shaped to be complimentarily engaged by an associated structure of the base portion of the beverage ingredient accessory device. The inner shell 300*a* may also comprise a plurality of apertures 330*a*, 330*b* with associated interior beveled edges 332*a*, 332*b*. While only two apertures 330*a*, 330*b* are illustrated, it is understood to be within the scope of the present invention to provide more than two apertures such that the apertures are symmetrically disposed about the circumference of the outer side curvature 310 of the inner shell 300*a*. The plurality of apertures 330*a*, 330*b* and their associated interior beveled edges 332*a*, 332*b* may, in the open configuration, advantageously align with the plurality of apertures 214 and associated interior beveled edges 218 of the outer shell 200*b* of FIG. 2B in order to create the optimized fluid flow dynamics within the beverage ingredient accessory device when the outer shell, inner shell and base portion are in the coupled configuration.

The alignment of the apertures 214 of the outer shell 200*b* with the apertures 330*a*, 330*b* of the inner shell 300*a* creates a series of unique, conjoined channels through which a liquid medium can flow. These channels form a coherent fluidic pathway, the dynamics of which are heavily influenced by the collective beveled edge structure created by the interior beveled edges 218 of the outer shell 200*b* and the interior beveled edges 332*a*, 332*b* of the inner shell 300*a*. This innovative design is critical in achieving optimized fluid dynamics within the beverage ingredient accessory device.

The dual structure of the interior beveled edges, located both at the outer shell 200*b* and inner shell 300*a*, further enhances the speed and efficiency of the fluid flow. As the liquid medium traverses through the conjoined apertures, it encounters two successive narrowing sections due to the beveled edges. This unique double-bevel structure replicates two stages of constriction similar to a Venturi pipe, creating two pressure drops and subsequently increasing fluid speed at each stage. This design, therefore, not only enhances the Venturi effect but also propels the fluid with increased momentum into the interior of the device.

The higher fluid velocity, combined with the strategic symmetric arrangement of the apertures around the outer side curvature 310 of the inner shell 300*a* and the outer side curvature 210 of the outer shell 200*b*, ensures an evenly distributed, high-speed fluid flow throughout the device. This results in a vigorous and well-distributed interaction between the beverage ingredient and the liquid medium, thereby accelerating the dissolution process. Thus, the symmetrical alignment and unique double-bevel structure of the apertures enable more efficient and effective dissolution of the beverage ingredient into the liquid medium.

In some embodiments, the collective double-bevel structure may embody various forms to optimize fluid flow dynamics within the device. For instance, both the interior beveled edges 218 of the outer shell 200*b* and the interior beveled edges 332*a*, 332*b* of the inner shell 300*a* could be designed as linear bevels with an up-sloping angle aligned back-to-back with a down-sloping angle, creating a dual-stage linear constriction that serves to intensify the speed of the liquid medium. The linear bevel design could be particularly beneficial for creating high-pressure gradients, essential for an optimized Venturi effect.

In some embodiments, the interior beveled edges 218, 332*a*, 332*b* of the outer and inner shells 200*b*, 300*a* may be shaped as convex radial bevels, curving inward toward one another in a similar back-to-back arrangement with a certain radius of curvature. The convex radial bevel could create a smoother transition of fluid flow through the apertures 214, 330*a*, 330*b*, reducing turbulence and maximizing fluid momentum. The radial bevel could be particularly effective for maintaining a sustained, high-speed fluid flow.

In some embodiments, one set of the interior beveled edges (e.g., 218 of the outer shell 200*b*) may follow a linear profile, while the other set (e.g., 332*a*, 332*b* of the inner shell 300*a*) may be designed with a radial profile. Such a hybrid design may take advantage of the pressure-enhancing properties of the linear bevel and the smooth-flow properties of the radial bevel. The specific configuration can be tailored based on the specific application, type of beverage ingredient, desired dissolution rate, and other relevant factors. These embodiments illustrate the versatility and adaptability of the double-bevel structure in enhancing fluid dynamics for efficient beverage ingredient dissolution.

Figure 3B:
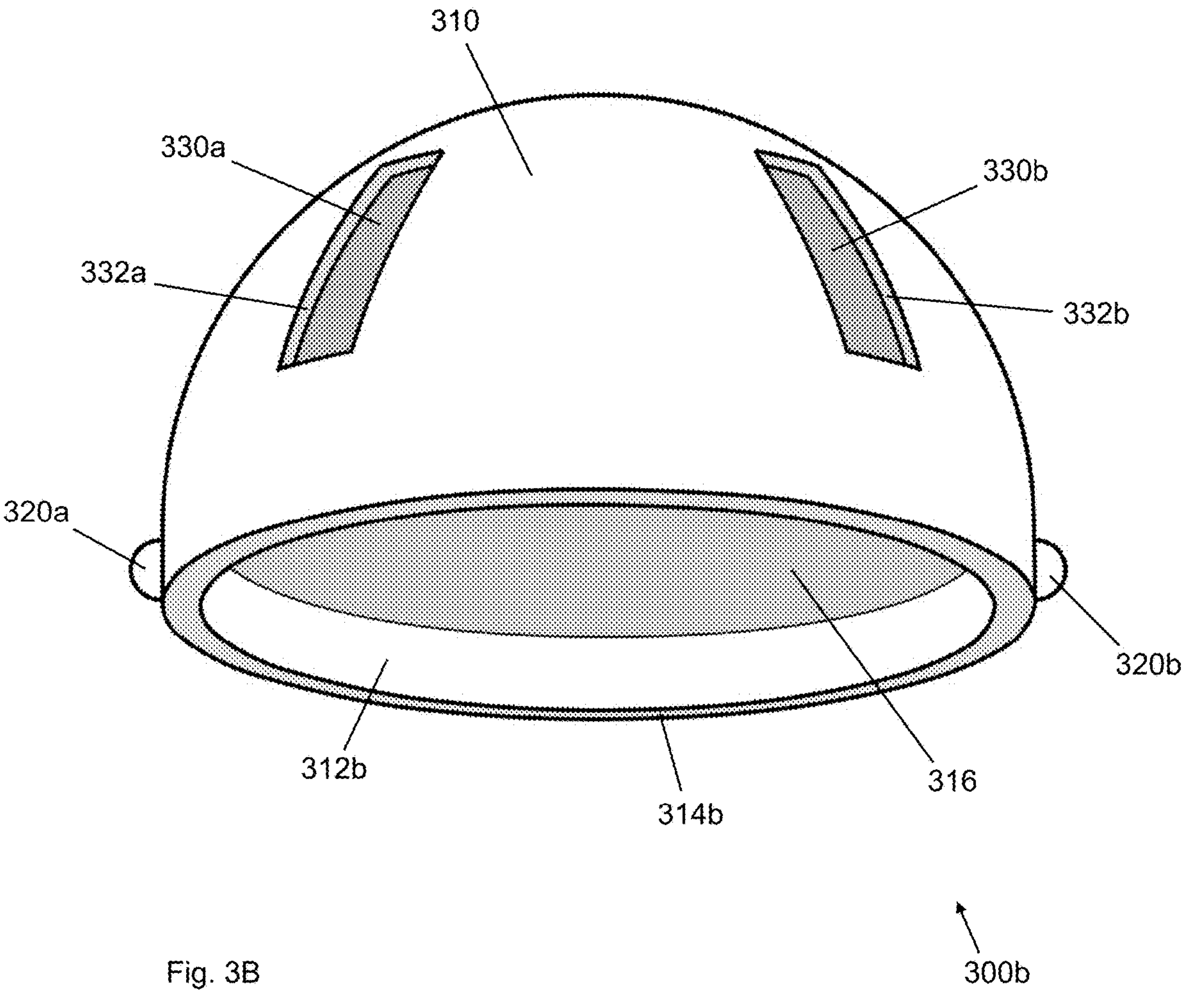
FIG. 3B illustrates a bottom perspective view of an inner shell of a cap portion of a beverage ingredient accessory device in accordance with some embodiments of the present invention.

As shown in FIG. 3B, a bottom perspective view of an inner shell 300*b* of a cap portion of a beverage ingredient accessory device is provided. The inner shell 300*b* may comprise the outer side curvature 310, first and second embossed structures 320*a*, 320*b*, first and second apertures 330*a*, 330*b*, associated interior beveled edges 332*a*, 332*b* illustrated and described with respect to the inner shell 300*a* of FIG. 3A. However, the inner shell 300*b* of FIG. 3B may further comprise a bottom portion inner curvature 312*b* having a radius of curvature value, a bottom surface lip 314*b* and an inner surface curvature 316 having another radius of curvature value.

The bottom portion inner curvature 312*b* and the inner surface curvature 316 may have a similar structural relationship to that between the bottom portion outer curvature 312*a* and the outer surface curvature 310 of the inner shell 300*a* of FIG. 3A. Specifically, in some embodiments, the bottom portion inner curvature 312*b* may not comprise any vertical radial curvature but may comprise a horizontal radial curvature value that is similar or identical to that of the horizontal radial curvature of the inner side curvature 316. The bottom surface lip 314*b* may be designed and structured to be disposed adjacent a top surface of a bottom portion of the beverage ingredient accessory device and form a seal therewith.

Figure 4A:
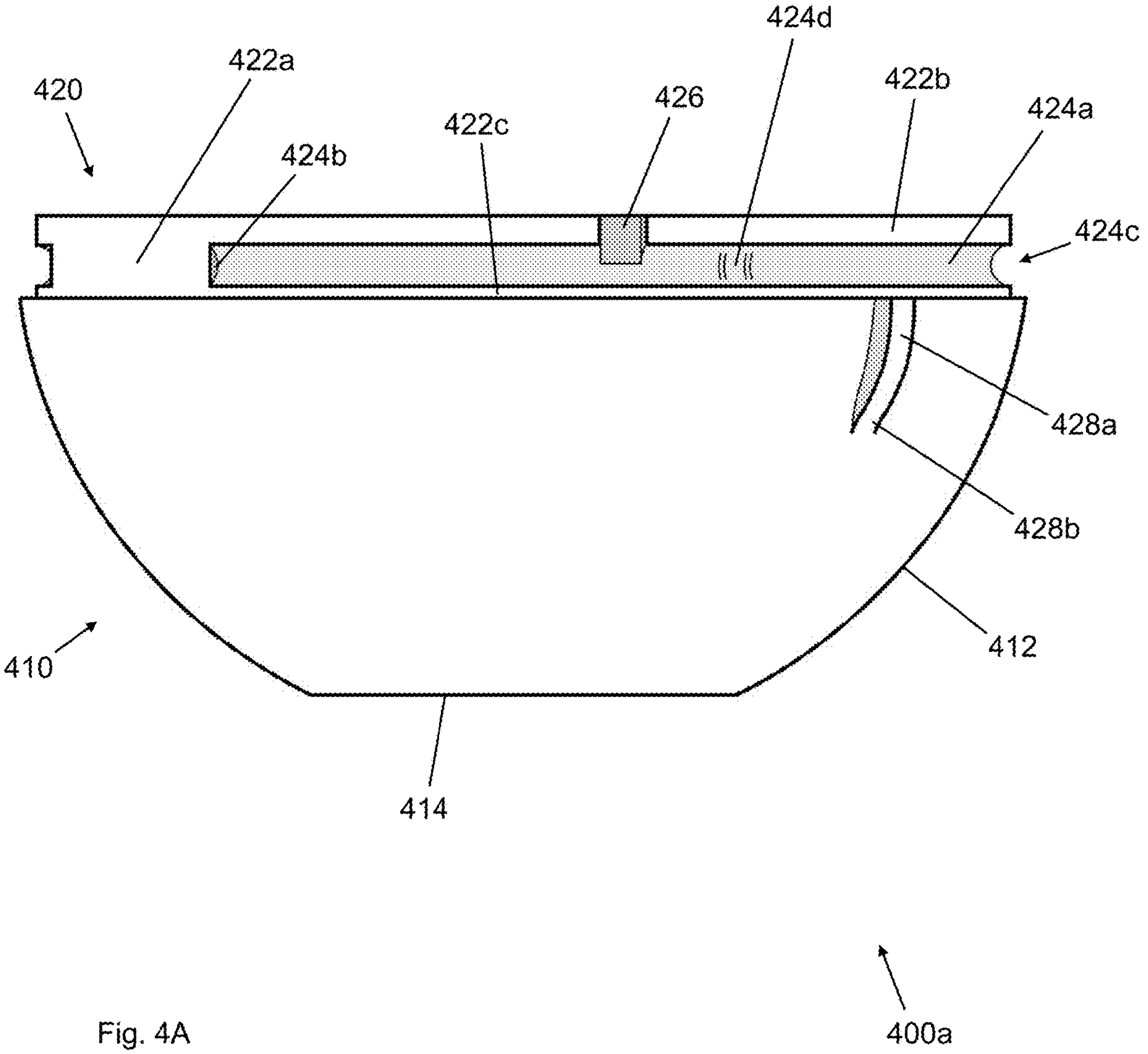
FIG. 4A illustrates a side elevational view of a base portion of a beverage ingredient accessory device in accordance with some embodiments of the present invention.

As shown in FIG. 4A, a side elevational view of a base portion 400*a* of a beverage ingredient accessory device is provided. The base portion 400*a* may comprise a bottom portion 410 and a top portion 420 disposed over the bottom portion 410. The bottom and top portions 410, 420 may be structurally unitary and monolithic with one another. Further, the outer diameter of the top portion 420 may be smaller than the outer diameter of the bottom portion 410 as illustrated in FIG. 4A.

The bottom portion 410 may comprise an outer side curvature 412 having a first radius of curvature value. The outer side curvature 412 may terminate at its lower vertical extent in a planar bottom surface 414 and at its upper vertical extent into the top portion 420 at an outer top surface lip 422*c*. The bottom planar surface 414 may comprise a high-friction stabilization layer disposed thereover in order to prevent the beverage ingredient accessory device from sliding across a surface while the user is attempting to fill the cavity within the bottom portion 410 with a beverage ingredient. The bottom portion 410 may further comprise at least one gripping structure 428*a* with an associated tapered contour portion 428*b* which is designed to seamlessly transition the structure of the gripping structure 428*a* back into the outer side curvature 412 of the bottom portion 410 thereby providing an ergonomic design complimentary to the shape of the user's fingers and thumbs.

The top portion 420 may comprise a vertical outer wall 422*a* which may have formed into it a contoured channel 424*a* with a plurality of terminal endpoints 424*b* that are partially defined by the vertical outer wall 422*a* as shown in FIG. 4A. The contoured channel 424*a* and terminal endpoints 424*b* may form at least one channel cavity 424*c* within the vertical outer wall 422*a*. Further, the vertical outer wall 422*a* may be segmented by the contoured channel 424*a* into a top strip forming an inner top surface lip 422*b* and a bottom strip forming the outer top surface lip 422*c* along a portion of the vertical outer wall 422*a* as shown in FIG. 4A. Additionally, the top strip of the vertical outer wall 422*a* and the contoured channel 424*a* may comprise a plurality of gaps 426 formed therein which may be shaped to accept in a complimentary manner the structure of one of the embossed structures of the outer shell of the cap portion of the beverage ingredient accessory device.

Further, the contoured channel 424*a* may comprise a plurality of structural indicator elements 424*d* which can be integrated into the design to provide mechanical feedback to the user when the embossed structures 232*a*, 232*b* of the outer shell 200*b*, rotating through the contoured channel 424*a*, reach a critical point such as a terminal endpoint 424*b*, a gap 426, or a point at which the outer shell 200*b* may be decoupled from the base portion 400*a*. Such indicator elements 424*d* could take the form of a tactile ridge, a detent, a change in curvature, a noticeable shift in resistance, or even an audible click.

Complimentary engagement between the structures of the base portion 400*a* and the outer shell 200*a* of FIG. 2A, for example, may be a key attribute in the structural design of the beverage ingredient accessory device. Specifically, the inner top surface lip 422*b* and the outer top surface lip 422*c* of the base portion 400*a* are designed to be disposed adjacent the inner perimeter lip 222 and the bottom surface lip 216, respectively, of the outer shell 200*a*. This precise fitting allows for a seamless transition between the base portion 400*a* and the outer shell 200*a* when they are in the coupled configuration, thereby preventing leakage of the beverage ingredient stored when the apertures are in the closed configuration.

Moreover, each gap 426 present in the top portion 420 is shaped to accept an embossed structure 232*a*, 232*b* of the outer shell 200*a*, enhancing the structural integrity of the device in its coupled state and allowing for the embossed structures 232*a*, 232*b* to translate back and forth through channel cavity 424*c* of the contoured channel 424*a* between the plurality of terminal endpoints 424*b*. This complimentary structural arrangement forms a locking mechanism that not only secures the device in the coupled configuration but also provides a tactile confirmation to the user when the apertures are properly aligned in the open and closed configurations.

Additionally, the gripping structures 428*a* of the base portion 400*a* and their associated tapered contour portions 428*b* may align with the corresponding gripping structures on the outer shell 200*a* to signify the relative position between the outer shell 200*a* and base portion 400*a* where they may be transitioned between decoupled and coupled configurations, while also facilitating a secure grip and smooth operation when the user seeks to perform such a transition of the device. This specific design aspect ensures the usability and the convenience of the device, enhancing its appeal in the market of beverage preparation accessories. Thus, through a combination of complementary shapes, contours, and fitting mechanisms, the outer shell 200*a* and the base portion 400*a* work together to form a robust, user-friendly, and functionally efficient beverage ingredient accessory device.

Figure 4B:
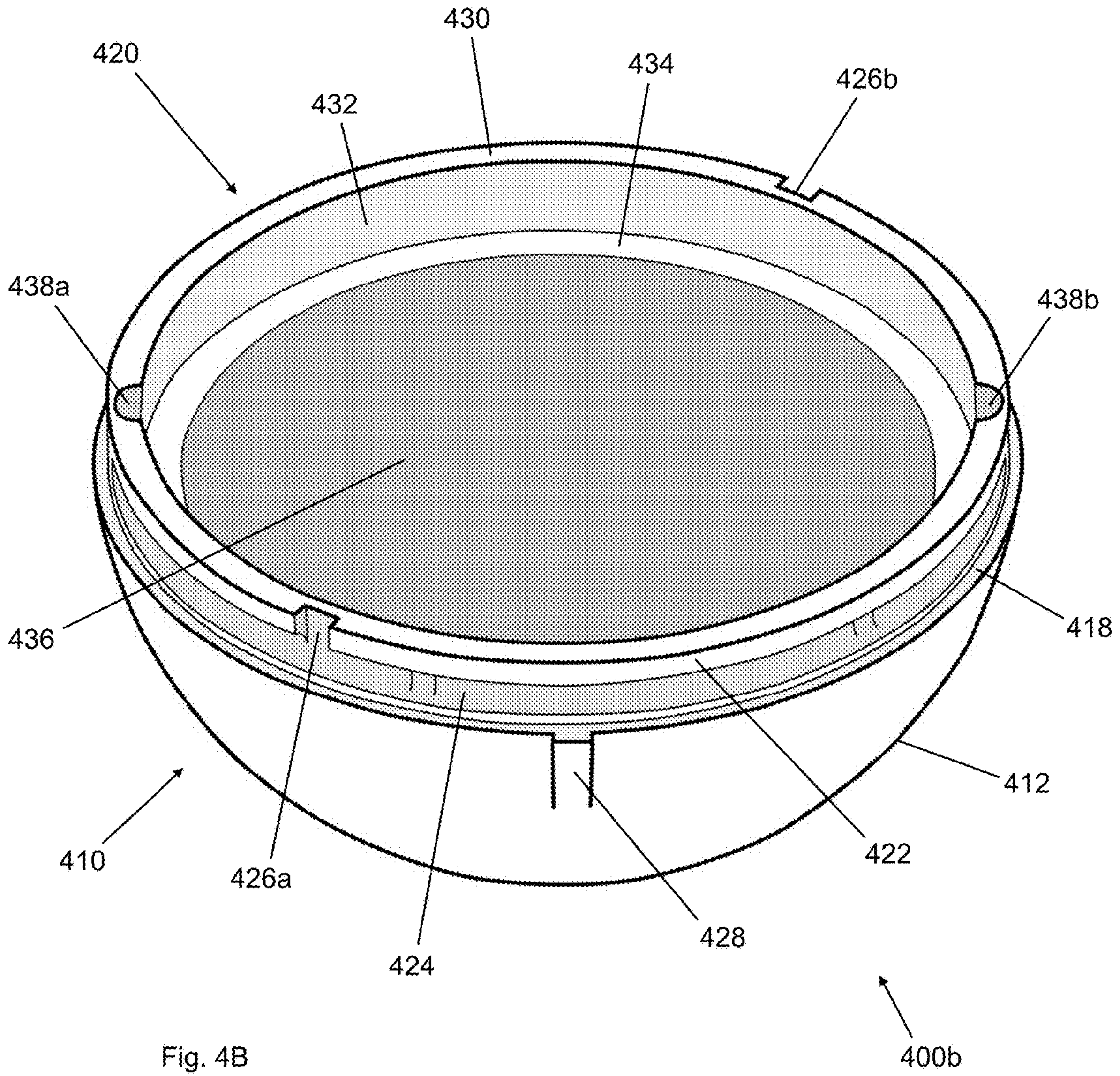
FIG. 4B illustrates a top perspective view of a base portion of a beverage ingredient accessory device in accordance with some embodiments of the present invention.

As shown in FIG. 4B, a top perspective view of a base portion 400*b* of a beverage ingredient accessory device is provided. The base portion 400*b* may comprise the bottom portion 410, the outer side curvature 412, the top portion 420, the vertical outer wall 422, the contoured channel 424, the plurality of gaps 426*a*, 426*b* and the gripping structures 428 illustrated and described with reference to the base portion 400*a* of FIG. 4A. However, the base portion 400*b* of FIG. 4B may further comprise a planar outer top surface lip 418, a planar inner top surface lip 430, an inner vertical wall 432, an interior lip 434, an inner side curvature 436 and a plurality of debossed structures 438*a*, 438*b* formed into the inner vertical wall 432.

The planar outer top surface lip 418 may be structured to engage with the bottom surface lip 216 of the outer shell 200*a*. The planar inner top surface lip 430 may be structured to engage with the inner perimeter lip 222 of the outer shell 200*a*. The inner vertical wall 432 may be structured to be disposed adjacent the bottom portion outer curvature 312*a* of the inner shell 300*a*. The interior lip 434 may be structured to engage with the bottom surface lip 314*b* of the inner shell 300*b*. The inner side curvature 436 may be structured to form a cavity therein which may retain one or more beverage ingredients. Further, the inner side curvature 436 may comprise a radius of curvature value similar or identical to that of the outer side curvature 412. The plurality of debossed structures 438*a*, 438*b* may be structured to complimentarily engage with the embossed structures 320*a*, 320*b* of the inner shell 300*b*. However, unlike the embosses structures 232*a*, 232*b* of the outer shell 200*b*, the embossed structures 320*a*, 320*b* of the inner shell 300*b* may not rotate upon insertion into the debossed structures 438*a*, 438*b*. This distinction may provide the means of achieving relative movement between the outer shell and the coupled base portion/inner shell structure.

The complimentary engagement between the outer shell 200*a*, the base portion 400*b*, and the inner shell 300*a* form a coupled configuration that not only securely houses the beverage ingredient within the cavity but also provides an effective seal that prevents leakage. The planar outer top surface lip 418 of the base portion 400*b* engages snugly with the bottom surface lip 216 of the outer shell 200*a*, while the planar inner top surface lip 430 of the base portion 400*b* corresponds with the inner perimeter lip 222 of the outer shell 200*a*. This double-lip seal creates an impervious barrier which guards against any accidental seepage of the beverage ingredient therefrom or of the liquid medium therein.

Inside the base portion 400*b*, the inner vertical wall 432 and interior lip 434 align with the bottom portion outer curvature 312*a* and the bottom surface lip 314*b* of the inner shell 300*a*, respectively. The debossed structures 438*a*, 438*b* present in the inner vertical wall 432 of the base portion engage with the embossed structures 320*a*, 320*b* of the inner shell 300*a*. Relative movement between the outer shell and the coupled base portion/inner shell structure is facilitated by this design. As the outer shell 200*a* is rotated, the apertures 214 on the outer shell align or misalign with the apertures 330*a*, 330*b* on the inner shell 300*a*, creating open and closed configurations respectively. In the open configuration, liquid medium can pass through the aligned apertures and interact with the beverage ingredient, initiating the mixing and dissolution process. In the closed configuration, the misaligned apertures prevent the liquid medium from entering the cavity, allowing the user to control the mixing process effectively.

The design of the contoured channels 424*a*, formed in the vertical outer wall 422*a* of the base portion 400*b*, in conjunction with the embossed structures 232*a*, 232*b* on the outer shell 200*b*, serves as an innovative method of restricting the movement of the shell's rotation to a single degree of freedom. This translates to a back-and-forth movement that is bound by the terminal endpoints 424*b* of the contoured channel 424*a*. The embossed structures 232*a*, 232*b*, as they engage with the contoured channels 424*a*, can only move along the path determined by the channel. This system functions similarly to a track, wherein the embossed structures 232*a*, 232*b* act as guides or wheels, navigating along the predetermined pathway of the contoured channel 424*a*.

This restricted motion, in turn, allows for precise alignment and misalignment of the apertures 214 on the outer shell 200*b* and the apertures 330*a*, 330*b* on the inner shell 300*a*. The limited degree of freedom ensures that the apertures transition reliably and predictably between the open and closed configurations, offering user-friendly control over the dissolution process of the beverage ingredient. This feature showcases how thoughtful design considerations not only enhance functional reliability but also contribute to a superior user experience while reducing ingredient waste and ingredient spillage.

Figure 5A:
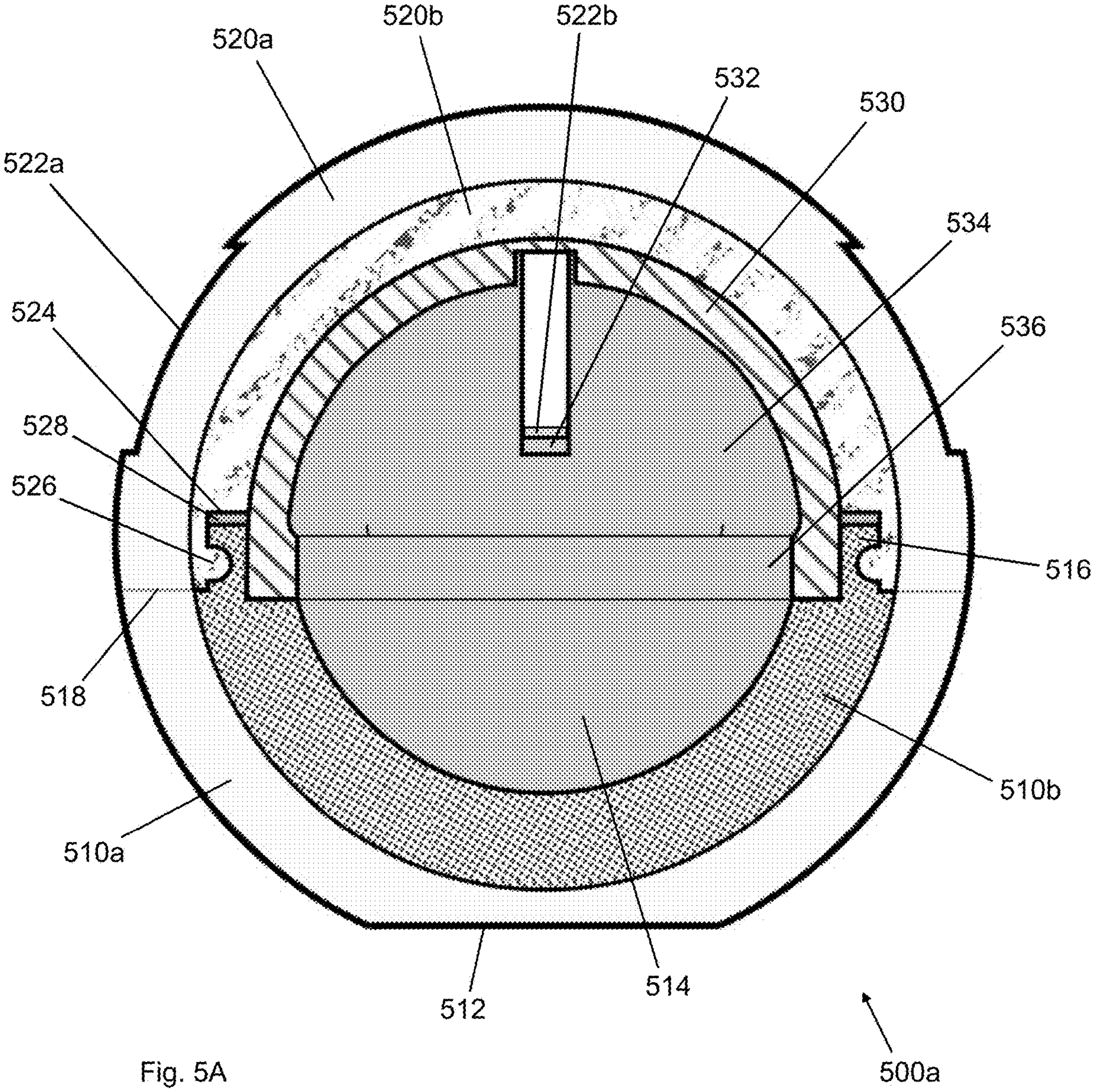
FIG. 5A illustrates a partial cross-sectional side elevational view of a beverage ingredient accessory device with a cap portion and base portion aligned in a coupled configuration and a plurality of apertures of the cap portion aligned in an open configuration in accordance with some embodiments of the present invention.

As shown in FIG. 5A, a partial cross-sectional side elevational view of a beverage ingredient accessory device 500*a* with a cap portion and base portion aligned in a coupled configuration and a plurality of apertures of the cap portion aligned in an open configuration is provided. An exterior base portion surface 510*a* covers an internal base portion material 510*b* which is bounded on its interior by an interior base portion surface 514. The exterior base portion surface 510*a* may further comprise a planar bottom surface 512 with a high-friction material layer disposed thereover. A top portion 516 of the base portion is illustrated in cross-section in order to show how it engages with embossed structures 526 and inner surfaces of an outer shell as well as outer and bottom surfaces of an inner shell as shown in FIG. 5A. In some embodiments, a top surface of the top portion 516 may be adjacent but not in direct immediate contact with an inner perimeter lip 524 of the outer shell, thereby forming a buffer zone 528 which provides space for the outer shell to more easily rotate relative the base portion.

The inclusion of the buffer zone 528 as a distinct structural feature of the beverage ingredient accessory device 500*a* offers a multitude of advantages pertaining to functionality, durability, and ease of operation. The buffer zone 528, situated between the top surface of the top portion 516 of the base portion and the inner perimeter lip 524 of the outer shell, provides an essential clearance that enables effortless rotation of the outer shell relative to the base portion.

Firstly, this allowance of clearance in the buffer zone 528 may serve to prevent seizing up of the structural components, thereby ensuring smooth and unrestricted movement during rotational adjustment of the outer shell. This is particularly critical for maintaining the operability of the device over its lifespan, as seized or tight-fit components could compromise the ease of rotation and misalignment/ alignment of the apertures, thus affecting the dissolution process of the beverage ingredient. Secondly, the buffer zone 528 minimizes the contact between the moving parts, which is advantageous in mitigating wear and tear. The reduced friction owing to this minimal contact may also contribute to the longevity of the mechanical components, as constant grinding could otherwise lead to premature wear and potential failure of the moving parts. Thirdly, the buffer zone 528 plays a vital role in preventing the build-up of beverage ingredient between adjacent surfaces. Without this zone, residual beverage ingredients might accumulate over time, complicating the relative movement of the outer shell and the base portion. This build-up could potentially make rotation strenuous and could also lead to hygiene issues if not cleaned thoroughly.

A coupling joint seam line 518 may define the coupling point between the exterior base portion surface 510*a* and an exterior outer shell surface 520*a*. Further, the coupling joint seam line 518 may be in the same horizontal plane as the bottom surface lip 216 of the outer shell 200*a*. The exterior outer shell surface 520*a* may cover an internal outer shell material 520*b* illustrated in cross-section in FIG. 5A. Further, a plurality of outer shell apertures 522*a* may be disposed within the exterior outer shell surface 520*a* and the associated first interior beveled edges 522*b* are illustrated as aligning with the plurality of inner shell apertures and associated second interior beveled edges 532 thereby defining the open configuration between inner and outer shell apertures which allows mixing of the liquid medium with one or more beverage ingredients stored therein. An inner shell material 530 is illustrated in cross-section and is bounded on an interior by an interior inner shell surface 534.

The sealed internal cavity structure of the beverage ingredient accessory device is highly advantageous for use with workout-related beverage ingredients such as preworkout powders, protein powders, creatine powders, or combinations thereof. The structure can provide a dedicated compartment for these ingredients, isolated from the primary liquid medium until the desired moment of mixing. This feature enables the user to prepare their workout drink in advance, while maintaining the freshness and potency of the ingredients. This separation also prevents any premature dissolving or clumping of the powders that can occur when mixed with the liquid medium ahead of time.

Furthermore, the selective aperture opening system, operated by the relative rotation of the device, offers precise control over the mixing process. The user can decide exactly when to release the ingredients into the main beverage, ensuring optimal freshness and effectiveness. This is especially important for workout enthusiasts who need to time their nutrient intake precisely around their training sessions. Moreover, this system allows the user to gradually introduce the powdered ingredient, facilitating better dissolution and preventing the formation of undesirable clumps or sediment.

Consequently, the beverage ingredient accessory device is not only convenient but also contributes to the overall quality and effectiveness of the workout drink.

In certain embodiments of the beverage ingredient accessory device, the sealed internal cavity may be specifically dimensioned to accommodate larger quantities of beverage ingredients. This may be particularly advantageous for users who consume beverage ingredients in higher volumes, such as protein powder, preworkout supplements, and other workout-related substances. The diameter of the internal cavity may range between 2 inches and 3 inches, offering a sizeable storage capacity while maintaining the portability and compact form factor of the device.

In the embodiment where a roughly spherical shape is utilized for the sealed internal cavity, the volumetric capacity can be determined using the formula for the volume of a sphere, $V=4/3*\pi*r^3$, where r is the radius of the sphere. For a diameter of 2 inches, the radius is 1 inch, and the resulting volume is approximately 4.19 cubic inches or around 68.6 milliliters. On the upper end, a diameter of 3 inches, with a radius of 1.5 inches, yields a volume of approximately 14.14 cubic inches or about 231.6 milliliters. These ranges accommodate a wide variety of beverage ingredients, providing flexibility for the user's individual needs. These estimates may vary slightly in the final product due to the device's non-perfectly spherical shape and other internal structures occupying some of the volume.

In various embodiments of the beverage ingredient accessory device, the wall thickness of the outer shell, inner shell, and base portion may range between 1.5 mm and 5 mm. This range is selected to balance two critical factors-form factor and ease of fabrication. A wall thickness within this range enables the device to maintain a compact, lightweight, and portable form factor that is comfortable to handle and easy to transport. Simultaneously, it provides enough material substance for the device's successful fabrication via modern production methods such as 3D printing, additive manufacturing, or injection molding.

A wall thickness below 1.5 mm may risk fragility during the device's usage, as the walls could become too thin to withstand the mechanical stresses of operation, potentially leading to cracks, leaks, or deformation. On the other hand, a thickness above 5 mm may result in an overly bulky and heavy device, diminishing its portability and ease of use. Moreover, it could add unnecessary material cost and potentially increase the manufacturing time. Therefore, a wall thickness in the range of 1.5 mm to 5 mm is considered optimal, striking a balance between durability, form factor, manufacturing efficiency, and cost-effectiveness.

The integration and interplay of the various structures and components in the beverage ingredient accessory device is underscored by the relationships between the radius of curvature values of various components. The outer shell outer side curvature 210 and the base portion bottom outer side curvature 412 share a similar or identical radius of curvature, demonstrating a structural consistency that contributes to the harmonized assembly and aesthetic continuity of the overall device. Similarly, the outer shell inner side curvature 220 and the inner shell outer side curvature 310 also share a similar or identical radius of curvature. This congruence ensures a seamless interface between the inner shell and the outer shell when they are coupled, enhancing the fluid dynamics inside the device and facilitating the precise alignment of the respective apertures during the rotational adjustment. Furthermore, the radius of curvature of the inner shell inner surface curvature 316 is designed to be similar or identical to the base portion inner side curvature 436. This relationship is instrumental in creating a uniform internal cavity, promoting consistent fluid flow, and maximizing the interaction between the liquid medium and the beverage ingredient housed within.

Lastly, the bottom portion curvature 230 of the outer shell, the top portion 420/vertical wall 422 of the base portion, and the bottom portion outer curvature 312*a* of the inner shell all exhibit a similar or identical lack of a radius of curvature value which denotes a virtually flat or planar surface in the vertically axial dimension. This similarity is crucial for ensuring a snug fit and proper alignment during coupling, thus facilitating the transition between open and closed configurations and promoting reliable sealing to prevent leakage. These carefully coordinated radii of curvature collectively contribute to the device's operational efficiency, structural integrity, and overall functionality.

The comparisons between the various radii of curvature values in the device structure provide key insights into the functional and mechanical design considerations for the beverage ingredient accessory device. In the context of a vertically axial cross-section (i.e. the x-y plane), the radius of curvature of the outer shell outer side curvature 210 and the base portion bottom outer side curvature 412, which form the outermost structural surfaces, is larger than that of the outer shell inner side curvature 220 and the inner shell outer side curvature 310. This descending trend continues with the inner shell inner surface curvature 316 and the base portion inner side curvature 436, which are smaller still in comparison to the aforementioned radii.

The smallest radius of curvature is observed for the bottom portion curvature 230 of the outer shell, the top portion 420/vertical wall 422 of the base portion, and the bottom portion outer curvature 312*a* of the inner shell. This gradation in radius values allows for the optimized engagement of each structural component with its counterpart, allowing for precise alignment, facilitating the transition between open and closed configurations, and ensuring a robust seal when the device is in the closed configuration.

The complementary relationship between the outer shell and the inner shell of the beverage ingredient accessory device is designed to ensure a close, flush engagement that prevents beverage ingredient from getting stuck in the small gaps or crevices. Specifically, the radius of curvature of the inner surface of the outer shell and the outer surface of the inner shell may be very similar or the same. This commonality in curvature enhances the congruence of the two shells when they are coupled, essentially creating a seamless joint that effectively resists the build-up of beverage ingredients.

In addition to this, the interior edges of the apertures on both the inner and outer shells may be beveled. These beveled edges further contribute to a smooth, flush interface between the inner and outer shells, further reducing the chances of residue build-up. The angle of the bevel and its smooth transition into the aperture can guide the beverage ingredients directly into or out of the cavity, preventing them from getting stuck between the shells. Furthermore, the beveled edges could also facilitate the cleaning process by minimizing sharp corners or abrupt transitions that might harbor residue. Therefore, the combination of matched curvatures and beveled edges significantly enhances the overall performance of the accessory device by ensuring an efficient, clean, and hassle-free use.

It is important to clarify that these comparisons and aforementioned descriptions of radius of curvature values throughout this description pertain to the curvature as observed in the vertically axial cross-section (x-y plane). They do not refer to the context of a horizontal axial cross-section (x-z plane), where the curvature values would be influenced by other design parameters such as the diameter and width of the device. This distinction is a factor in understanding the fluid dynamic behavior and mechanical functionality of the device.

Figure 5B:
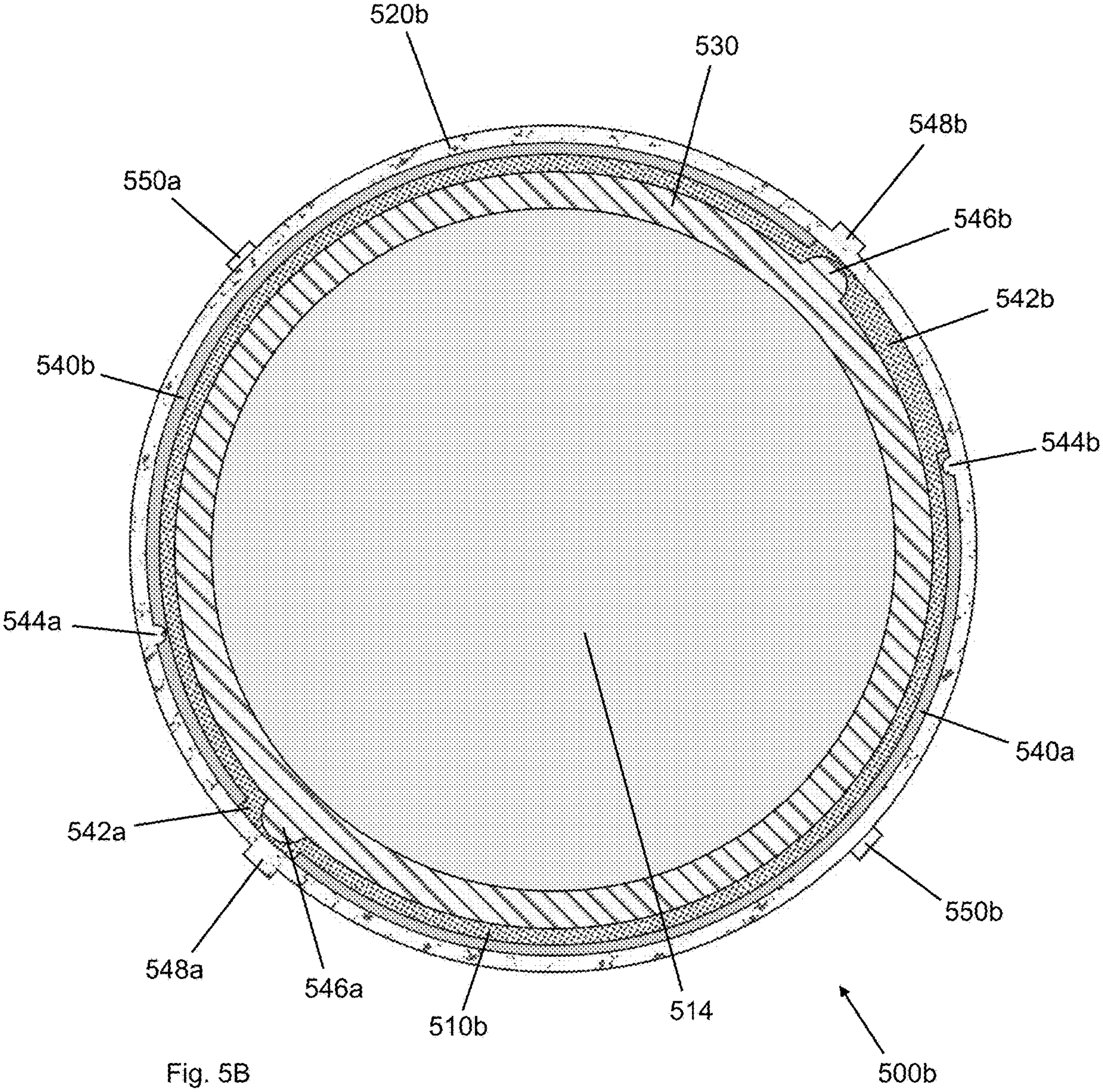
FIG. 5B illustrates a partial cross-sectional top elevational view of a beverage ingredient accessory device with a cap portion and base portion aligned in a coupled configuration and a plurality of apertures of the cap portion aligned in an open configuration in accordance with some embodiments of the present invention.

As shown in FIG. 5B, a partial cross-sectional top elevational view of a beverage ingredient accessory device 500*b* with a cap portion and base portion aligned in a coupled configuration and a plurality of apertures of the cap portion aligned in an open configuration is provided. While a vertical cross-section was taken in FIG. 5A, a horizontal cross-section is taken in FIG. 5B which further illustrates the various complimentary structural interconnection between the base portion, the outer shell and the inner shell. Specifically, the internal base portion material 510*b* and vertical wall terminal endpoints 542*a*, 542*b* associated therewith coupled with the internal outer shell material 520*b* define a plurality of contoured channels 540*a*, 540*b* through which first and second outer shell embossed structures 544*a*, 544*b* may rotate circumferentially in one degree of freedom between the terminal endpoints 542*a*, 542*b*.

Additionally, formed into the vertical wall terminal endpoints 542*a*, 542*b* are respective debossed structures which are shaped to receive first and second inner shell embossed structures 546*a*, 546*b*. It is advantageous that the first and second outer shell embossed structures 544*a*, 544*b* be smaller than the first and second inner shell embossed structures 546*a*, 546*b* due to the embossed structures 544*a*, 544*b* having to rotate through respective contoured channels 540*a*, 540*b* while the embossed structures 546*a*, 546*b* remain stationary within the debossed structures of the terminal endpoints 542*a*, 542*b*.

Further, the interior base portion surface 514 may be disposed adjacent an inner surface of the internal inner shell material 530. Moreover, outer shell may comprise first and second outer shell gripping structures 548*a*, 548*b* disposed on opposing sides thereof as shown while the base portion may comprise first and second base portion gripping structures 550*a*, 550*b* disposed on opposing sides thereof as shown. In the decoupled configuration, the outer shell and base portion gripping structures may be vertically aligned. In the coupled configuration, the outer shell and base portion gripping structures may be vertically misaligned. In the decoupled configuration, the first and second outer shell embossed structures 544*a*, 544*b* may be aligned with associated gaps 426*a*, 426*b* of the base portion 400*b* of FIG. 4B. In the coupled configuration, the first and second outer shell embossed structures 544*a*, 544*b* may be misaligned with associated gaps 426*a*, 426*b* of the base portion 400*b* of FIG. 4B, thereby securing the embossed structures 544*a*, 544*b* within respective contoured channels 540*a*, 540*b*.

In various embodiments of the beverage ingredient accessory device, one or more structural indicator elements can be integrated into the design to provide mechanical feedback to the user when the embossed structures of the outer shell, rotating through the contoured channel, reach a critical point such as a terminal endpoint, a gap, or a decoupling point. Such indicator elements could take the form of a tactile ridge, a detent, a change in curvature, a noticeable shift in resistance, or even an audible click.

These structural indicator elements can serve as useful alerts to the user that additional rotation is no longer needed to achieve a specific goal, whether that be to decouple the outer shell from the base portion, to open the apertures, or to close the apertures. This kind of mechanical feedback system can significantly improve the user experience by providing real-time feedback on the functional status of the device and eliminating any guesswork involved in rotating the components. This ensures that the user is always aware of the current configuration of the device, which is particularly beneficial given that the embossed structures are not directly visible while they respectively rotate within one or more contoured channels. Furthermore, these indicators can also prevent over-rotation and the potential damage it could cause, thereby enhancing the overall durability and lifespan of the device.

The symmetry of the various structural elements such as the gripping structures, embossed structures, gaps, and debossed structures on opposing sides of their respective components, such as the base portion, outer shell, and inner shell, contributes to several ergonomic and fabrication advantages in the design of the beverage ingredient accessory device. Ergonomically, the symmetrical disposition of these features ensures a balanced grip and uniform load distribution while handling the device. The first and second outer shell gripping structures 548*a*, 548*b*, as well as the first and second base portion gripping structures 550*a*, 550*b*, provide multiple gripping points for the user, increasing the ease of rotation and adjustment of the device components. This allows for smooth operation and transition between the decoupled and coupled configurations, as well as the open and closed states.

From a fabrication standpoint, the symmetrically arranged embossed and debossed structures facilitate uniform and efficient mold design, making the manufacturing process more streamlined and cost-effective. The symmetry also improves the uniformity of heat distribution during the molding process, which can reduce the occurrence of material defects, such as warping or shrinkage, thereby enhancing the overall quality and durability of the device.

In some embodiments of FIGS. 1-5B, the outer top surface lip, the inner top surface lip and the interior lip of the base portion may be referred to as a first top surface lip, a second top surface lip and a third top surface lip, respectively. Similarly, the bottom surface lip and the inner perimeter lip of the outer shell and the bottom surface lip of the inner shell may respectively be referred to as a first bottom surface lip, a second bottom surface lip and a third bottom surface lip of the cap portion.

In some embodiments of FIGS. 1-5B and in light of the design constraints and user requirements of the beverage ingredient accessory device, a number of materials can be deemed suitable for its mold fabrication process. These materials must possess a balance of durability, cost-effectiveness, compatibility with molding techniques, and safety for both users and the environment. One such material is polypropylene (PP). PP is a thermoplastic polymer that is highly resistant to fatigue, making it an ideal candidate for a device that is subject to repeated use. It is also an economical choice and is widely used in consumer products due to its versatility. Furthermore, PP is BPA-free, dishwasher-safe, and has a low melting point, making it amenable to various molding techniques including injection molding, which is often used for mass production.

Another beneficial material is high-density polyethylene (HDPE). HDPE is a robust thermoplastic that is highly resistant to impact, an important quality for a device designed for everyday use. HDPE is also resistant to many solvents, ensuring that the device can safely interact with a variety of beverages. Like PP, HDPE is BPA-free and dishwasher-safe, making it a safe choice for users. Its ease of molding and relatively low cost make it a viable option for mass production.

Finally, copolyester plastic, a BPA-free plastic material, might also be a viable choice. This material may be advantageously used in the food and beverage industry due to its clarity, durability, and safety. Copolyester plastic may also be advantageous for its superior dishwasher durability, chemical resistance, and toughness, making it suitable for a product that will be frequently exposed to hot water and various beverage ingredients. Furthermore, its compatibility with injection molding techniques makes it suitable for the efficient mass production of the beverage ingredient accessory device.

All these materials provide advantageous properties for the fabrication of the beverage ingredient accessory device. Their suitability for molding processes, coupled with their durability, safety, and cost-effectiveness, makes them excellent candidates for the construction of this product. Furthermore, their resistance to common solvents ensures that the device can be used in a wide range of drinkable liquid mediums without compromising the structural integrity or safety of the device.

Additionally, each of the materials mentioned—polypropylene (PP), high-density polyethylene (HDPE), and copolyester plastic—are all food-grade safe. They are free of Bisphenol-A (BPA), a chemical that has raised health concerns due to its potential to leach into food or beverages under certain conditions. PP and HDPE are both types of polyethylene, one of the most common plastics in the world. Both materials have a high melting point, which means they do not easily degrade or leach chemicals when exposed to heat, making them safe for use in microwaves and dishwashers. Copolyester plastic is a BPA-free and dishwasher-safe alternative to polycarbonate, another clear plastic which previously raised health concerns due to BPA. Copolyester plastic is free of any estrogenic and androgenic activity (EA-free), meaning it does not interfere with hormones in the body.

In some embodiments of FIGS. 1-5B, a beverage ingredient accessory device is provided comprising a base portion comprising a base portion outer side curvature, a first top surface lip and a second top surface lip, wherein the base portion outer side curvature terminates into the first top surface lip, and the second top surface lip comprises a diameter smaller than that of the first top surface lip; and a cap portion disposed adjacent the base portion and comprising a cap portion outer side curvature, a first bottom surface lip and a second bottom surface lip, wherein: the cap portion outer side curvature terminates into the first bottom surface lip, the cap portion outer side curvature comprises a plurality of apertures disposed therethrough, and the second bottom surface lip comprises a diameter smaller than that of the first bottom surface lip.

In some embodiments of FIGS. 1-5B, one or more base portion gripping structures are disposed symmetrically about the base portion outer side curvature, one or more cap portion gripping structures are disposed symmetrically about the cap portion outer side curvature, a planar base portion bottom surface comprises a high-friction material layer disposed thereover, the plurality of apertures comprises a plurality of inner apertures and a plurality of outer apertures, and each of the plurality of apertures comprises an interior beveled edge.

In some embodiments of FIGS. 1-5B, the base portion comprises one or more contoured channels, each of the one or more contoured channels comprises a plurality of terminal endpoints, the second top surface lip is disposed above the first top surface lip, at least one contoured channel is disposed between the second top surface lip and the first top surface lip, a plurality of gaps are formed into an outer edge of the second top surface lip, a plurality of debossed structures are formed into an inner edge of the second top surface lip, and each of the plurality of debossed structures are shaped to accept an embossed structure of the cap portion.

In some embodiments of FIGS. 1-5B, the base portion comprises an inner vertical wall disposed above the third top surface lip, the inner vertical wall terminates into the third top surface lip, the inner vertical wall terminates into the second top surface lip, and a plurality of debossed structures are formed into the inner vertical wall.

In some embodiments of FIGS. 1-5B, the cap portion and the base portion are structurally separate and non-monolithic, the cap portion and the base portion are fabricated from the same fabrication material, and the fabrication material comprises one or more of polypropylene, polyethylene, and copolyester plastic.

In some embodiments of FIGS. 1-5B, a beverage ingredient accessory device is provided comprising a base portion comprising a base portion outer side curvature, a first top surface lip and a second top surface lip, wherein: the base portion outer side curvature terminates into the first top surface lip, and the second top surface lip comprises a diameter smaller than that of the first top surface lip; and a cap portion disposed adjacent the base portion and comprising a cap portion outer side curvature, a first bottom surface lip and a second bottom surface lip, wherein the cap portion outer side curvature terminates into the first bottom surface lip, the cap portion outer side curvature comprises a plurality of apertures disposed therethrough, and the second bottom surface lip comprises a diameter smaller than that of the first bottom surface lip, and when the cap portion and the base portion are in a coupled configuration, the first top surface lip of the base portion is disposed adjacent the first bottom surface lip of the cap portion, the second top surface lip of the base portion is disposed adjacent the second bottom surface lip of the cap portion, and a third top surface lip of the base portion is disposed adjacent a third bottom surface lip of the cap portion.

In some embodiments of FIGS. 1-5B, a beverage ingredient accessory device is provided comprising a base portion comprising a base portion outer side curvature, a first top surface lip and a second top surface lip, wherein: the base portion outer side curvature terminates into the first top surface lip, and the second top surface lip comprises a diameter smaller than that of the first top surface lip; and a cap portion disposed adjacent the base portion and comprising a cap portion outer side curvature, a first bottom surface lip and a second bottom surface lip, wherein the cap portion outer side curvature terminates into the first bottom surface lip, the cap portion outer side curvature comprises a plurality of apertures disposed therethrough, and the second bottom surface lip comprises a diameter smaller than that of the first bottom surface lip, and when the cap portion and the base portion are in a coupled configuration, an embossed structure of the cap portion is disposed within a contoured channel of the base portion.

The specification and drawings are to be regarded in an illustrative rather than a restrictive sense. However, it will be evident that various modifications and changes may be made thereunto without departing from the broader spirit and scope of the invention as set forth in the claims. Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

All features disclosed in the specification, claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

Throughout this disclosure, the phrase 'modularly coupled' and similar terms and phrases are intended to convey that any element of a given class of elements may be coupled to another given element and vice versa with equal effect. For example, any extension cord of a plurality of extension cords may be modularly coupled to another extension cord and vice versa with equal effect. Further, throughout this disclosure, the phrase 'removably coupled' and similar terms and phrases are intended to convey that a given element may be iteratively coupled to and removed from another given element as desired. For example, a male plug of a first extension cord may be removably coupled to a female plug of a second extension cord as desired.

The use of the terms "a," "an," "the," and similar referents in the context of describing the disclosed embodiments (especially in the context of the following claims) are to be construed to cover both the singular and the plural, unless otherwise indicated or clearly contradicted by context. The terms "comprising," "having," "including," and "containing" are to be construed as open-ended terms (i.e., meaning "including, but not limited to,") unless otherwise noted. The term "coupled" or "connected," where unmodified and referring to physical connections, is to be construed as partly or wholly contained within, attached to, or joined together, even if there is something intervening. Recitation of ranges of values are merely intended to serve as a shorthand method of referring individually to each separate value falling within the range, unless otherwise indicated and each separate value is incorporated into the specification as if it were individually recited. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," is understood with the context as used in general to present that an item, term, etc., may be either A or B or C, or any nonempty subset of the set of A and B and C, unless specifically stated otherwise or otherwise clearly contradicted by context. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

The use of any examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, although above-described elements may be described in the context of certain embodiments of the specification, unless stated otherwise or otherwise clear from context, these elements are not mutually exclusive to only those embodiments in which they are described; any combination of the above-described elements in all possible variations thereof is encompassed by the scope of the present disclosure unless otherwise indicated or otherwise clearly contradicted by context.

All references, including publications, patent applications, and patents, cited are hereby incorporated by reference to the same extent as if each reference were individually and specifically indicated to be incorporated by reference and were set forth in its entirety.

The invention claimed is:

1. A beverage ingredient accessory device, comprising:

a base portion comprising a base portion outer side curvature, a first top surface lip and a second top surface lip, wherein:

the base portion outer side curvature terminates into the first top surface lip, and the second top surface lip comprises a diameter smaller than that of the first top surface lip; and a cap portion disposed adjacent the base portion and comprising a cap portion outer side curvature, a first bottom surface lip and a second bottom surface lip, wherein:

the cap portion outer side curvature terminates into the first bottom surface lip, the cap portion outer side curvature comprises a plurality of apertures disposed therethrough, and the second bottom surface lip comprises a diameter smaller than that of the first bottom surface lip.

2. The beverage ingredient accessory device of claim 1, wherein one or more base portion gripping structures are disposed symmetrically about the base portion outer side curvature.

3. The beverage ingredient accessory device of claim 1, wherein one or more cap portion gripping structures are disposed symmetrically about the cap portion outer side curvature.

4. The beverage ingredient accessory device of claim 1, wherein a planar base portion bottom surface comprises a high-friction material layer disposed thereover.

5. The beverage ingredient accessory device of claim 1, wherein the plurality of apertures comprises a plurality of inner apertures and a plurality of outer apertures.

6. The beverage ingredient accessory device of claim 1, wherein each of the plurality of apertures comprises an interior beveled edge.

7. The beverage ingredient accessory device of claim 1, wherein the base portion comprises one or more contoured channels.

8. The beverage ingredient accessory device of claim 7, wherein each of the one or more contoured channels comprises a plurality of terminal endpoints.

9. The beverage ingredient accessory device of claim 1, wherein the second top surface lip is disposed above the first top surface lip.

10. The beverage ingredient accessory device of claim 9, wherein at least one contoured channel is disposed between the second top surface lip and the first top surface lip.

11. The beverage ingredient accessory device of claim 1, wherein a plurality of gaps are formed into an outer edge of the second top surface lip.

12. The beverage ingredient accessory device of claim 1, wherein a plurality of debossed structures are formed into an inner edge of the second top surface lip.

13. The beverage ingredient accessory device of claim 12, wherein each of the plurality of debossed structures are shaped to accept an embossed structure of the cap portion.

14. The beverage ingredient accessory device of claim 1, wherein the base portion comprises an inner vertical wall disposed above the third top surface lip.

15. The beverage ingredient accessory device of claim 14, wherein the inner vertical wall terminates into the third top surface lip.

16. The beverage ingredient accessory device of claim 14, wherein the inner vertical wall terminates into the second top surface lip.

17. The beverage ingredient accessory device of claim 14, wherein a plurality of debossed structures are formed into the inner vertical wall.

18. The beverage ingredient accessory device of claim 1, wherein:

the cap portion and the base portion are structurally separate and non-monolithic, the cap portion and the base portion are fabricated from the same fabrication material, and the fabrication material comprises one or more of polypropylene, polyethylene, and copolyester plastic.

19. A beverage ingredient accessory device, comprising:

a base portion comprising a base portion outer side curvature, a first top surface lip and a second top surface lip, wherein:

the base portion outer side curvature terminates into the first top surface lip, and the second top surface lip comprises a diameter smaller than that of the first top surface lip; and a cap portion disposed adjacent the base portion and comprising a cap portion outer side curvature, a first bottom surface lip and a second bottom surface lip, wherein:

the cap portion outer side curvature terminates into the first bottom surface lip, the cap portion outer side curvature comprises a plurality of apertures disposed therethrough, and the second bottom surface lip comprises a diameter smaller than that of the first bottom surface lip, and when the cap portion and the base portion are in a coupled configuration, the first top surface lip of the base portion is disposed adjacent the first bottom surface lip of the cap portion, the second top surface lip of the base portion is disposed adjacent the second bottom surface lip of the cap portion, and a third top surface lip of the base portion is disposed adjacent a third bottom surface lip of the cap portion.

20. A beverage ingredient accessory device, comprising:

a base portion comprising a base portion outer side curvature, a first top surface lip and a second top surface lip, wherein:

the base portion outer side curvature terminates into the first top surface lip, and the second top surface lip comprises a diameter smaller than that of the first top surface lip; and a cap portion disposed adjacent the base portion and comprising a cap portion outer side curvature, a first bottom surface lip and a second bottom surface lip, wherein:

the cap portion outer side curvature terminates into the first bottom surface lip, the cap portion outer side curvature comprises a plurality of apertures disposed therethrough, and the second bottom surface lip comprises a diameter smaller than that of the first bottom surface lip, and when the cap portion and the base portion are in a coupled configuration, an embossed structure of the cap portion is disposed within a contoured channel of the base portion.

* * * * *